United States Patent
Yang

(10) Patent No.: US 7,266,044 B2
(45) Date of Patent: Sep. 4, 2007

(54) METHOD AND APPARATUS FOR ACOUSTIC SOURCE TRACKING USING A HORIZONTAL LINE ARRAY

(75) Inventor: Tsih C. Yang, Great Falls, VA (US)

(73) Assignee: United States of America represented by the Secretary of the Navy, Washington, DC (US)

( * ) Notice: Subject to any disclaimer, the term of this patent is extended or adjusted under 35 U.S.C. 154(b) by 374 days.

(21) Appl. No.: 11/014,457

(22) Filed: Dec. 17, 2004

(65) Prior Publication Data

US 2006/0133211 A1   Jun. 22, 2006

(51) Int. Cl.
   *G01S 3/86* (2006.01)
(52) U.S. Cl. .................... 367/124; 367/129
(58) Field of Classification Search ............ 367/119, 367/124, 129
   See application file for complete search history.

(56) References Cited

U.S. PATENT DOCUMENTS

| | | | | |
|---|---|---|---|---|
| 5,481,505 | A * | 1/1996 | Donald et al. | 367/124 |
| 5,914,912 | A * | 6/1999 | Yang | 367/119 |
| 6,424,596 | B1 * | 7/2002 | Donald | 367/124 |
| 6,525,994 | B2 * | 2/2003 | Donald et al. | 367/124 |
| 6,654,315 | B1 * | 11/2003 | Carter et al. | 367/124 |

OTHER PUBLICATIONS

Gershman et al., "Experimental Performance of Adaptive Beamforming in SOnar Environment with a Towed Array and Moving Interfering Sources," IEEE Transactions on Signal Processing, vol. 48, No. 1, Jan. 2000.*

T.C. Yang "Motion compensation for adaptive horizontal line array processing" J. Acoust. Soc. Am. 113 (1), Jan. 2003 245-260.

T.C. Yang "Beam intensity striations and applications" J. Acoust. Soc. AM 113 (3), Mar. 2003 1342-1352.

* cited by examiner

*Primary Examiner*—Ian J. Lobo
(74) *Attorney, Agent, or Firm*—John J Karasek; Suresh Koshy

(57) ABSTRACT

An apparatus for processing passive acoustic signals received on a horizontal line array that were either emitted from an underwater object or echo returned from an object, is proposed to track the motion (bearing change and range change) of an object (target) relative to the receiver horizontal line array. Adaptive array processing for a moving object is biased for a moving source when the number of data samples is limited by the stationariness condition. Motion compensation can be carried out in the beam domain by beam shifting for a bearing changing object and frequency shifting for a range changing object. The method includes receiving acoustic signals from the target, determining the beam covariance matrices, determining the target bearing rate and range rate, processing the beam covariance matrices by compensating for the target motion, and producing a beam power plot versus time. Interference signal is suppressed when the interference source does not have the same motion (bearing and range rate) as the target. The method does not need detailed environmental acoustic information of the sound channel normally required to model the sound propagation.

10 Claims, 14 Drawing Sheets

METHOD AND APPARATUS FOR ACOUSTIC SOURCE TRACKING USING A HORIZONTAL LINE ARRAY

TECHNICAL FIELD

This invention relates to a method and apparatus for acoustic source detection and tracking in bearing and range using a large aperture horizontal line array, and more particularly, to a method and apparatus for acoustic source detection and tracking in bearing and range that suppresses interference signals by accounting for spatial asymmetry between source motion and interferer motion.

DESCRIPTION OF RELATED ART

Signal processing in underwater acoustics has been centered around the problem of detection and localization of a target or signal in an ocean waveguide. Such detection and localization of a low level acoustic signal (e.g., a quiet target) involves the use of an array of a large number of hydrophones, which enhances the target signal-to-noise ("S/N") ratio by the array spatial processing gain. The array, for example, includes a horizontal aperture to estimate the signal bearing.

In an ocean environment, particularly in shallow water, many interference sources, e.g., loud surface ships, are present, interfering with the detection and directional finding of a target signal. Interference rejection involves utilization of, for example, a narrow beam width and an adaptive beamforming algorithm. A large aperture horizontal array ("HLA") can be used to exclude many distributed interfering sources (e.g., long range ships) outside the search beam. High-resolution adaptive beamforming produces a narrow beam width and suppresses the contribution of such interfering sources by placing nulls at the interference bearings (commonly referred to as interference nulling). The larger the horizontal aperture, the narrower the beam resolution and the higher the array gain.

Interference suppression is critical to the detection of a weak signal, lest the signal could be masked by side lobes from the loud interferences, such as signals from surface ships. This involves, for example, narrow beams and adaptive array processing. To track the signal, one needs range estimation, besides bearing determination. The existing processing techniques have difficulty in achieving these two goals when the source is moving. In principle, the larger the horizontal array aperture, the better the performance in bearing, range estimation and in interference suppression. However, in practice, source motion severely degrades the performance as discussed below.

Range estimation is generally described as follows. Standard array processing assumes that the signal arrives as a plane wave. While this assumption is widely accepted for radar signal processing, it is not a good assumption for underwater acoustic signals. The sound wave in an ocean waveguide encounters reflections from ocean boundaries (i.e., surface and bottom), refraction by the ocean medium, which affects the depth dependent sound speed profile, and scattering by rough boundaries and ocean inhomogeneities. The signal is a superposition of many curved wave fronts, or multipaths, arriving at the receivers at different elevation/depletion angles.

Conventional beamforming uses the concept of delay and sum of received plane wave signals to estimate the target bearing. Conventional beamforming does not require detailed environmental acoustic information, such as the sound speed profile as a function of depth, the sediment sound speed and attenuation, thickness, etc. A nominal sound speed of 1500 m/s is often used. Such a conventional beamforming processor is environment-independent. However, no range information is available using plane wave beamforming.

To estimate range, a modification of conventional beamforming has been proposed assuming a spherical curvature wave front for the emitted acoustic signal. This is called range-focused beamforming, as the curvature wave front depends on the source range. To estimate the target range, range-focused beamforming is applied to data, assuming several hypothesized target ranges. The beam outputs with the highest intensities are used to estimate the target range. Range estimation is limited to a target at near broadside directions and at ranges less than the Fresnel zone. The range-focused beamforming approach breaks down at near endfire directions.

With the advent of matched field/mode/beam processing, it is possible to extend the detection range by exploiting the multipath arrivals of low frequency signals using, for example, a large aperture vertical or horizontal array. Improved signal gain is obtained because matched field processing matches the data with signal propagation in the waveguide. Matched field processing may also be used for source localization. The parameter estimation aspect of the method has been extensively investigated. Assuming that the acoustic environment of the ocean is known and that the signal can be modeled for all source ranges and depth of interest, the bearing, range, and depth of the target is estimated by the highest correlation point in the correlation ambiguity function. If the correlation is in terms of the mode or beam amplitudes of the replica and data field, one uses matched-mode or matched-beam processing. This processing requires detailed environmental acoustic information in order to properly model the signal propagation in the ocean. Conversely, lack of adequate environmental information presents a major obstacle in applying this processing to the real world data. The mismatch between the model and the real world can result in poor performance, such as erroneous estimation of the source range. For a moving source, mismatch can result in large scatters in range estimates, causing ambiguities and incorrect range tracking. Matching the data at different ranges demands a higher fidelity in signal propagation modeling.

Interference rejection is generally described as follows. As mentioned above, in an ocean environment, particularly in shallow water, many loud surface ships are present, interfering with the detection and directional finding of a target signal. Interference rejection involves, for example, a narrow beam width and a low sidelobe level. This is accomplished, for example, by using a large aperture horizontal array ("HLA"), which filters out discrete interfering sources (e.g., long-range ships) outside the search beam.

If the objective is to detect a weak source in the background of high noise or many interfering signals such as that produced by merchant ships, conventional beamforming for a horizontal line array is inadequate because of its wide beam width and high sidelobe levels. A narrow beam is needed to detect a weak signal in a bearing close to that of an interference signal. If the beam width is large, a weak signal with a bearing less than the beam width away from a strong interferer is not detectable. If the sidelobe level is not sufficiently low, sidelobe leakage from interfering sources, which can be tens of dB stronger in level than a target, can easily mask the weak target.

Adaptive array processing is used to overcome the above shortcomings. A popular algorithm for adaptive array processing is the minimum variance distortionless response ("MVDR") method. This method minimizes the array beam outputs in all directions except the signal direction. It thus yields a low sidelobe level and also a minimal beam width, both being significantly lower than that of conventional beamforming.

However, adaptive array processing assumes a plane wave model as in conventional beamforming. For passive acoustic source detection in an ocean waveguide, adaptive array processing suffers from a mismatch between a plane wave signal model and the real signal. For MVDR, while the sidelobe and noise level are minimized by the minimum variance method, the signal level is also greatly diminished by the mismatch between the signal and a plane wave. This signal mismatch problem is minimized using a white noise constraint, which adjusts the processor to near conventional output at the source direction while maintaining minimum variance at other directions.

Adaptive array processing, such as MVDR, places a null at the interferer direction and therefore can be used to suppress the interfering signal. To remove or suppress the interfering signal, one often uses the eigenvector decomposition method. The strongest interfering signal can usually be associated with the strongest eigenvalue obtained by eigenvector decomposition of the covariance matrix, or the cross-spectral density. Interference suppression can therefore be achieved by removing these eigenvectors from the covariance matrix or the weighting factor. This is referred to as the "dominant mode rejection" method.

The above MVDR methods, as well as other adaptive processing approaches, assume the existence of a well-conditioned covariance matrix for the target and interference signals. In practice, however, the true covariance matrix is not known and must be estimated from the data. A large number of data samples is normally required to reduce the variance of the estimated covariance matrix. When the source and interferers are both stationary, one can integrate the covariance matrix over a long period of time. When the target and interference sources are moving, as often is the case, the non-stationariness of the acoustic environment limits the number of data samples (i.e., snapshots) available for estimating the covariance matrix, resulting in a "snapshot-deficient" condition. Adaptive beam power estimates will be biased under such a "snapshot-deficient" condition. The performance degradation is worse as the array aperture increases, thus defeating the purpose of a large aperture HLA. This is referred to as the source motion (i.e., degradation) effect on adaptive array processing.

For example, consider a line array of N=100 sensors, with spacing of 6 m, and thus a total aperture of L=594 m. In data processing, the fast Fourier transform ("FFT") window must be large enough so that the signal received on all elements lies within this window. Thus, $\tau \geq L/c \sim 0.4$ s, where c=1500 m/s is the nominal sound speed in water. For a target changing bearing, the stationariness condition requires that the target stay in the same beam. If the target changes bearing at a range of 5 km, with a velocity of 20 knots, the target will stay in a beam of 2° up to $T=R\theta/v=17$ sec. For this period of time, the maximum number of data frames is 17/0.4=43. This number of data frames is much smaller than the number of sensors (N=100). This is called a "snapshot-deficient" condition. The MVDR processor will suffer a severe beam power degradation under the snapshot deficient condition. When the number of data samples (M) equals the number of sensors (N), the MVDR beam power suffers a −6 to −12 dB loss for a line array of 4-16 sensors. If the number of snapshots is three times the number of sensors (M=3N), the loss is only 1 dB. If the number of snapshots is less than the number of sensors (M<N), the loss is expected to be worse than M=N case. The amount of beam power loss increases with the number of sensors on the array. Thus, the general rule is that the number of snapshots (i.e., data frames) should be equal or greater than the number of sensors. However, in the practical sonar world, this condition is rarely met for a large aperture horizontal line array when the source or the interferer is moving.

The dominant mode rejection method mentioned above assumes that the eigenvectors of the largest eigenvalues are associated with the interference sources, and that interference suppression can be achieved by removing these eigenvectors from the covariance matrix or the weighting factor. The advantage of this method is that it requires a shorter integration time than the fully adaptive MVDR, since the large eigenvalues can be estimated using a smaller number of data samples. Its performance has been studied and compared with the MVDR method.

If, instead, one uses a large number of data samples to estimate the covariance matrix, the penalty of ignoring the non-stationariness condition is described as follows. For moving sources, the consequence is a spread of the signal energy as measured by the eigenvalue spectrum of the covariance matrix from one to more eigenvalues. The price paid is a loss of signal energy and a reduced ability to reject the interferers. A remedy is to limit the signal loss using the white noise constraint, but the performance is severely degraded compared with the stationary source/interferers case.

The above discussion summarizes two problems in sonar array processing for a large aperture horizontal line array. One problem is the non-stationariness due to target/interferer motion, creating a snapshot deficient condition. The purpose of a large aperture horizontal line array is to enhance signal detection by suppressing/rejecting interfering signals through adaptive array processing. This function is severely limited by the snapshot-deficient condition. The other problem is lack of robustness in target range estimation and tracking. At long ranges, the only processors that offer range estimation are those that do matched field/mode/beam processing. These processors require detailed environmental acoustic information to model the signal propagation in an ocean waveguide. When environmental acoustic information are lacking or are inaccurate, the results are erroneous, thereby effectively voiding the use of a large aperture array for source localization.

SUMMARY OF THE INVENTION

An embodiment of the invention includes an apparatus comprising a horizontal line array comprising a plurality of hydrophones for receiving a target acoustic signal from a target and an interference acoustic signal from an interference source. The apparatus also includes a processor cooperating with the horizontal line array, the processor detecting the target, at least in part, by compensating for target motion and/or interference motion.

Optionally, the target motion comprises target bearing and/or target ranging, and the interference motion comprises interference bearing and/or interference ranging. Optionally, the target comprises a target bearing rate and a target range rate, the interference source comprises an interference bearing rate and an interference range rate, and the processor suppresses the interference acoustic signal based on a difference between the target bearing rate and/or the target range rate, and the interference bearing rate and/or the interference range rate.

Optionally, the processor determines a beam covariance matrix for the target from a plurality of hydrophone covariance matrices corresponding to the plurality of hydrophones. Optionally, the beam covariance matrix includes a target-search sub-space beam covariance matrix representing a largest beam power of the target, and an interference sub-space beam covariance matrix representing an interference contribution from the interference source, the processor separating the target-search sub-space from the interference sub-space by suppressing the interference contribution.

Optionally, the processor shifts the target-search sub-space beam covariance matrix according to a plurality of estimated target-bearing rates, thereby generating a plurality of shifted target-search sub-space beam covariance matrices, the processor summing the plurality of shifted target-search sub-space beam covariance matrices, the processor identifying a largest eigenvalue of a sum of the shifted plurality of shifted target-search sub-space beam covariance matrices, the processor identifying a calculated target bearing rate from the largest eigenvalue the processor shifting the beam covariance matrix by the calculated target bearing rate, the processor applying adaptive array processing to the shifted beam covariance matrix.

Optionally, the processor shifts a frequency scale of the target-search sub-space beam covariance matrix according to a plurality of estimated target-range rates, thereby generating a plurality of shifted target-search sub-space beam covariance matrices, the processor summing the plurality of shifted target-search sub-space beam covariance matrices, the processor identifying a largest eigenvalue of a sum of the shifted plurality of shifted target-search sub-space beam covariance matrices, the processor identifying a calculated target range rate from the largest eigenvalue, the processor shifting the beam covariance matrix by the calculated target range rate, the processor applying adaptive array processing to the shifted beam covariance matrix.

Optionally, the processor shifts the target-search sub-space beam covariance matrix according to a plurality of estimated target-bearing rates, thereby generating a plurality of bearing-rate-shifted target-search sub-space beam covariance matrices, the processor shifting a frequency scale of the plurality of bearing-rate-shifted target-search sub-space beam covariance matrices according to a plurality of estimated target-range rates, thereby generating a plurality of bearing-rate-and-range-rate-shifted target-search sub-space beam covariance matrices, the processor summing the plurality of bearing-rate-and-range-rate-shifted target-search sub-space beam covariance matrices, the processor identifying a largest eigenvalue of a sum of the plurality of bearing-rate-and-range-rate-shifted target-search sub-space beam covariance matrices, the processor identifying a calculated target bearing rate and a calculated target range rate from the largest eigenvalue, the processor shifting the beam covariance matrix by the calculated target bearing rate and the calculated target range rate, the processor applying adaptive array processing to the shifted beam covariance matrix.

Optionally, the apparatus also includes a display cooperating with the processor to display at least one of the target bearing rate and the target range rate as a function of time.

For example, this invention includes a signal processor that tracks the source bearing and range, and integrates over the source motion. This processor is, for example, environment-independent, or tolerant, and is therefore, for example, insensitive to environment mismatch as opposed to other range trackers, such as matched field processing, that require detailed environmental acoustic information, such as water column sound speed profile and/or bottom parameters. Coherent time integration of the source motion yields a temporal processing gain over and above the normal adaptive array spatial processing gain. Optionally, the motion compensation algorithm recovers the motion-induced signal power loss suffered by adaptive array processing such as the MVDR processor carried out in the element space. When the interferer and target have different motions, this processor provides additional interference suppression beyond the normal suppression of a stationary interference signal provided by adaptive array processing. For example, the processor is carried out in the beam domain. During the course of developing an embodiment of the invention, it was recognized that, in the element domain, the eigenvalues of the covariance matrix, integrated over a large number of data frames, are spread into many eigenvalues due to source motion. The target and interference signal eigenvalues are no longer clearly separable, as a result, the ability to remove the interference signal is greatly diminished. During the course of developing an embodiment of the invention, it was recognized that, in the beam domain, the target and interference signals at different bearings often belong to different beam sub-space, and can be integrated separately by searching for the target bearing and range rate. As a result, in such an embodiment of the invention, the eigenvalues of the signal are restored to that equivalent of a stationary source. The target signal is coherently integrated whereas the interfering signals are processed incoherently, remaining at a level as before integration.

Another embodiment of the invention includes a method of instructing the above-mentioned processor to detect and/or track a target as described above.

BEST MODE FOR CARRYING OUT THE INVENTION

Figure 1:
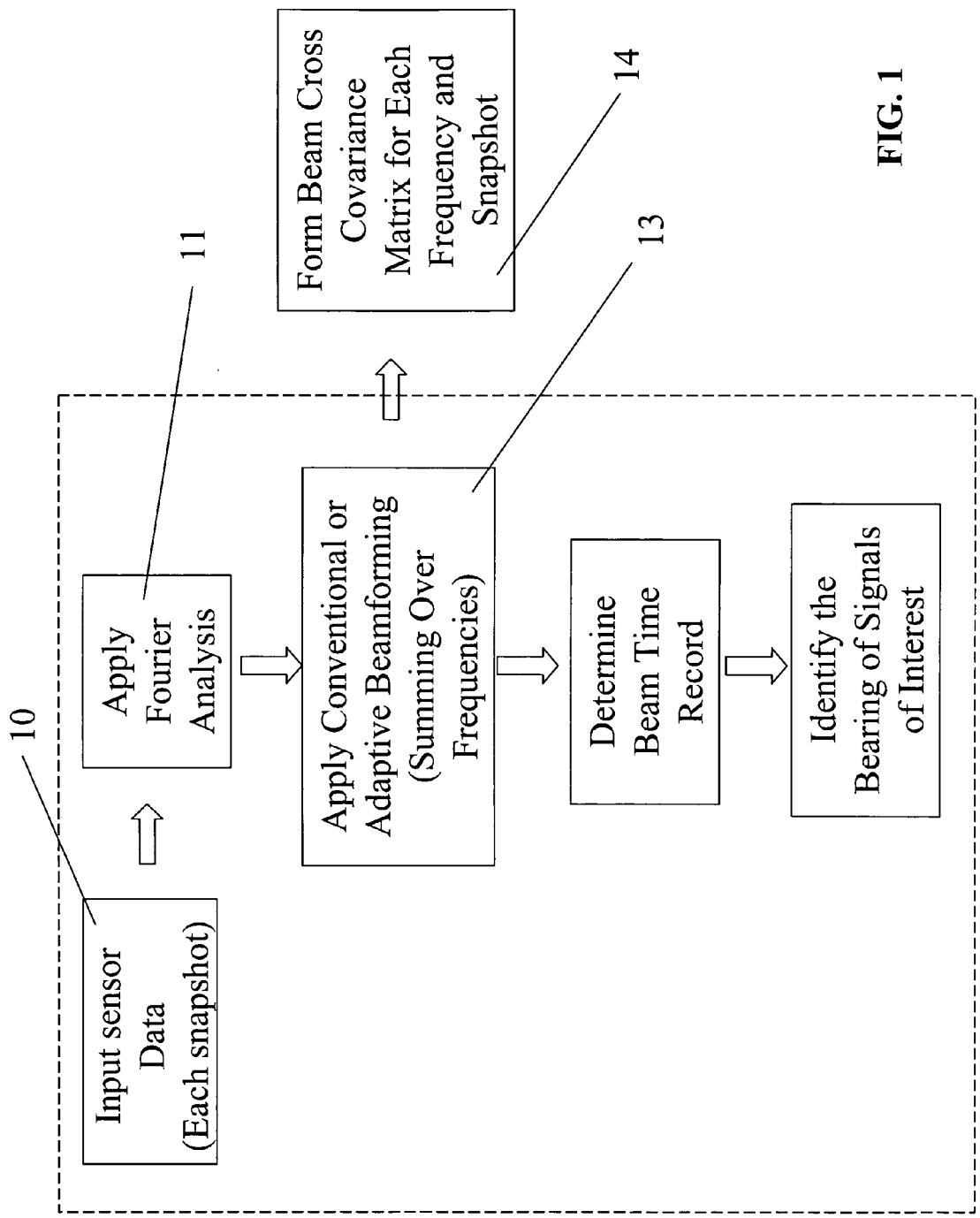
FIG. 1 is a flowchart of a standard beamforming process in the phone space.

For motion compensation and/or environment-independent source tracking, an embodiment of the instant invention, for example, processes broadband signals in the beam domain. When the signal and interference field occupy different beams, the motion will spread the beam covariance eigenvalue spectrum from one to two (or even three) eigenvalues, but the eigenvalues and eigenvectors of the signal and interference remain in two separate beam sub-spaces centered on the signal and interference bearings. For a source changing bearing, motion effect can be compensated by integrating over the signal beam covariance matrix (i.e., the beam covariance sub-matrix in the signal space) that synchronizes with the source bearing-rate. For a source changing range, elements of the signal beam covariance matrix have the same range and frequency dependence as predicted by the wave-guide invariant theory. The source range-change can be compensated by, for example, frequency-change (i.e., shift). Using the beam-domain motion compensation algorithm, adaptive array processing, such as MVDR, yields the same beam power and beam width for the moving source as the stationary source for both the bearing and range change cases. Also, the interference power is suppressed by the motion compensation algorithm when the interferer has a different motion than the signal source.

Adaptive array beamforming is often based on estimation of the signal covariance matrix. For example, referring to the standard beamforming process flowchart of FIG. 1, the conventional MVDR beamforming algorithm in Step 13 as given by $$B^{MVDR}(\theta) = \frac{1}{p^H R^{-1} p}, \quad (1)$$

where $R=<p_{data}p_{data}^H>$ is the covariance matrix obtained from the received pressure field at a fixed frequency, obtained after Fourier analysis in Step 11 from the input data in Step 10; the superscript H denotes Hermition conjugate. The variable p (without subscript) is the replica field or the steering vector. The bold face, capital R denotes a matrix, the bold face lower case p denotes a vector. For plane wave beamforming, the nth element of the steering vector p is given by $$p_n = \exp(-jk_0 x_n \sin \theta), \quad (2)$$

where $\theta$ is the steering vector measured from the broadside of the horizontal line array (HLA) and $k_0$ is the wavenumber. For a uniformly distributed line array, $x_n = nd$, where d is the phone spacing.

Conventional beamforming multiplies the pressure field for each element of the HLA by a phase factor according to a plane wave arrival at the steered angle, $$a_i = a(\theta_i) = \Sigma_n \exp(-jk_0 x_n \sin \theta_i) p_n = \Sigma_n T_{in} p_n \quad (3)$$

where $k_0$ is the wavenumber for sound speed $c_0=1500$ m/s, $\theta_i$ is the angle of the ith beam and $T_{in}$ is the i,n-th element of a matrix T. For a uniformly spaced HLA, $x_n = nd$, and $T_{in} = \exp(-jk_0 dn\kappa_i)$, where $\kappa_i = \sin \theta_i$ and d is the element spacing. Assuming that beams are uniformly spaced in the $\kappa_i$ space, with a total number of beams equaling the number of phones N, one notes that T is an orthogonal matrix satisfying $TT^H = T^H T = NI$. Equation (4) below states that the beam vector a is an orthogonal transformation of the pressure vector p, expressed in vector-matrix notion as $$a = Tp. \quad (4)$$

In FIG. 1, the beam covariance matrix 14 is then given by $$Q = <a_{data} a_{data}^H> = TRT^H, \quad (5)$$

where $a_{data}$ is the conventional beam output for the received data, replacing p by $p_{data}$ in Eq. (6). The beam space MVDR algorithm, denoted as MBDR for distinction, is given by $$B^{MBDR}(\theta) = (a^H Q^{-1} a)^{-1} \quad (6)$$

where the beam steering vector is obtained using Eq. (3) after substituting the plane wave steering vector p from Eq. (2).

Figures 2A, 2B:
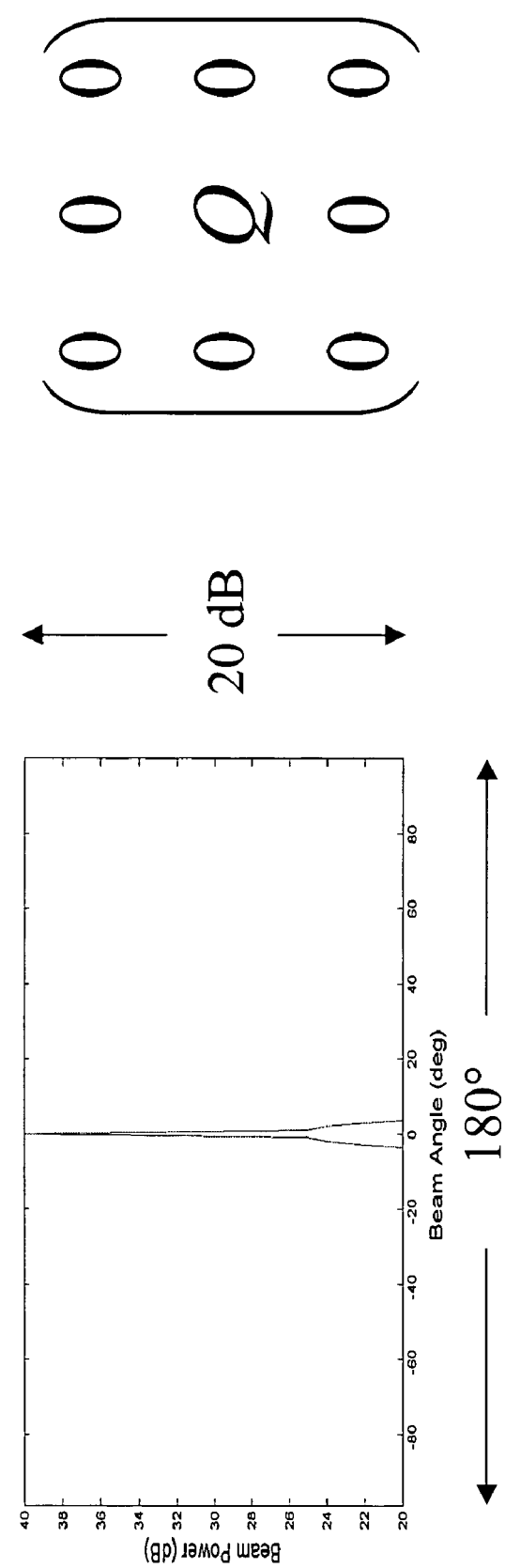
FIG. 2A is an illustrative graph of a beam pattern.
FIG. 2B is an illustrative beam covariance matrix using conventional beamforming.

The steering/search angle at the look direction is denoted as $\theta_S$, the signal angle (bearing) as $\theta_T$, and the beam index used in matrix multiplication as $\theta_i$. The beam steering vector a is the conventional beam output for a plane wave arriving at the angle $\theta_S$. It has a beam width $\sin(\theta_i - \theta_S) \cong 1/N$, N being the number of sensors on the HLA, as shown in FIG. 2A. Thus, the elements of the beam steering vector a are small except for the ±w beams adjacent to the signal-look beam. This is particularly so for a large aperture HLA, where the sidelobe levels are low. In this approximation, only the 2w+1 beam sub-space of the beam covariance matrix, as shown in FIG. 2B, will contribute to the MBDR output at angle $\theta_S$. Thus we can use a beam sub-space processor $$B^{MBDR}(\theta) = (\hat{a}^H \hat{Q}^{-1} \hat{a})^{-1}, \quad (7)$$

where $\hat{a}$ is a sub-vector of a, of dimension 2w+1, and $\hat{Q}$ is a sub-matrix of Q, of dimension (2w+1)×(2w+1) indexed around the signal-look directions. The parameter w denotes the number of signal beams covered by the signal beam width. For example, if the beam width is 2° and a beam is formed at each degree, then w=2. For this case, the matrix inversion will be for a 5×5 matrix, which is much faster than the inversion of a matrix of dimension 100×100 in the element space.

Search for Target Bearing Rate for a Fixed Target Range

Figure 3:
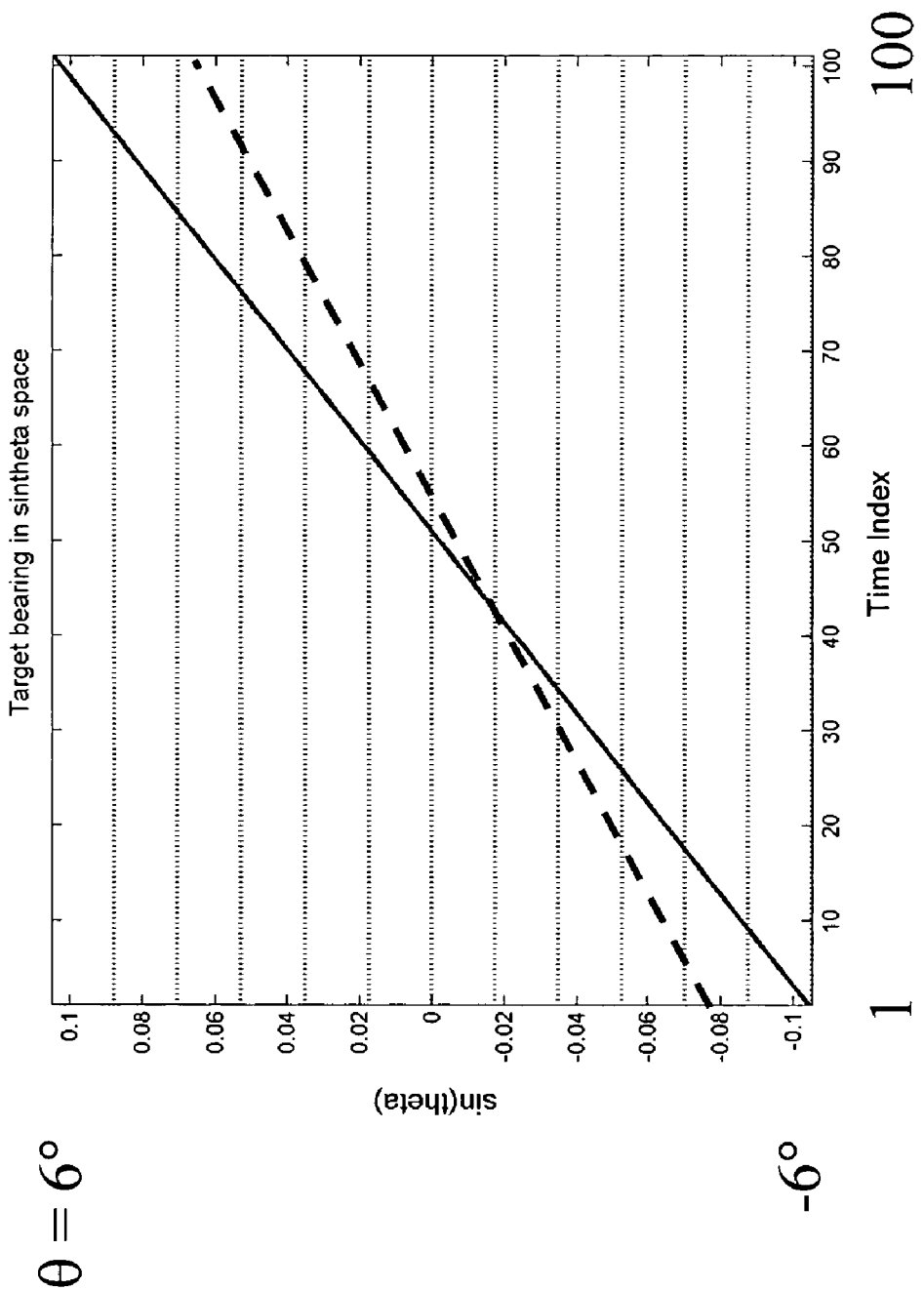
FIG. 3 is an illustrative graph of a true target bearing (solid curve) versus a hypothesized target bearing (dashed curve) as a function of time.

An embodiment of the invention including a beam domain motion compensation algorithm works as follows. From the bearing time record using, for example, conventional beamforming, a target of interest can be found. Its approximate bearing and the corresponding beam sub-space for the target signal are determined. The processor need not know the exact bearing-rate and will search for the bearing-rate that yields the highest beam power for the signal beam sub-space, as determined by the value of its first eigenvalue. For a given bearing rate, a bearing track is constructed. As an example, FIG. 3 shows the target bearing track in the sin θ space for an initial bearing of −6° with a hypothesized bearing rate of 0.12 deg/unit-time. The target bearing rate is only approximately known from the bearing time record. The dashed line in FIG. 3 shows a hypothetical bearing track as part of the search. The target bearing changed by an amount Δθ over a time period of $\Delta t = t_i - t_j$, yielding a bearing rate $\alpha = \Delta\theta/\Delta t$.

Figures 4A, 4B:
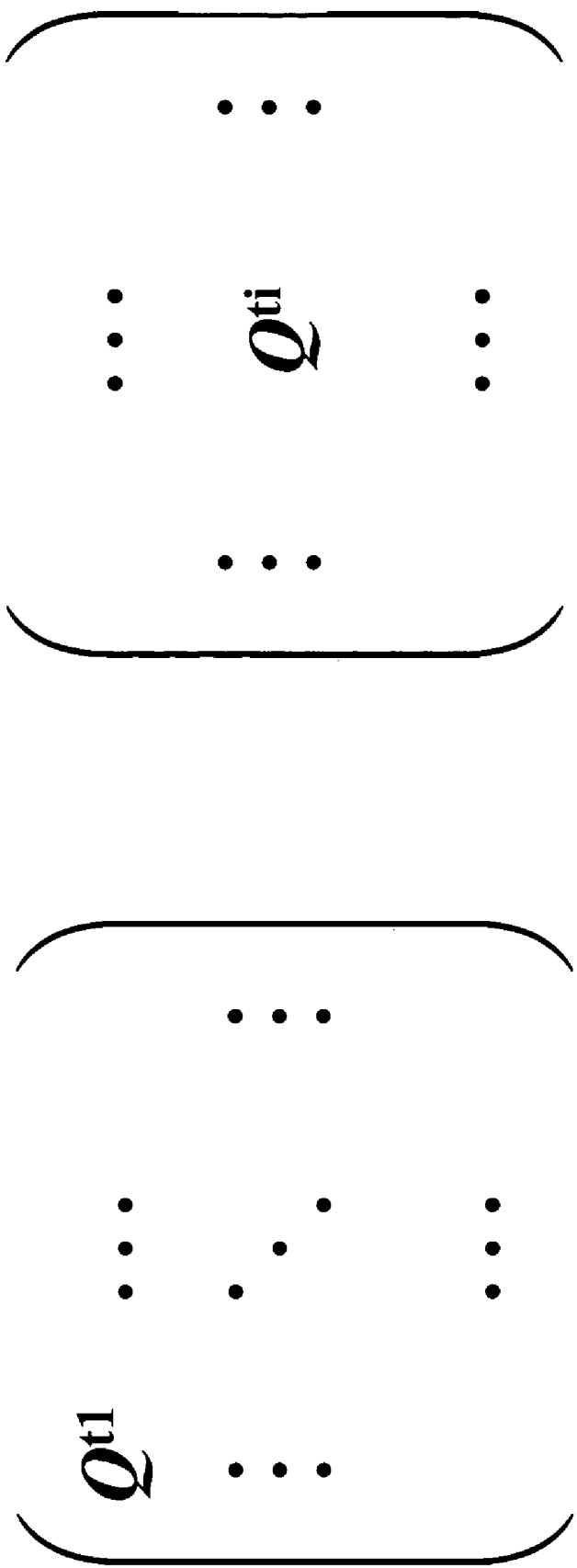
FIG. 4A is representation of a beam covariance matrix at time $t_i$ as a target changes bearing.
FIG. 4B is representation of beam covariance matrices at time $t_i$ as a target changes bearing.
Figures 5A, 5B:
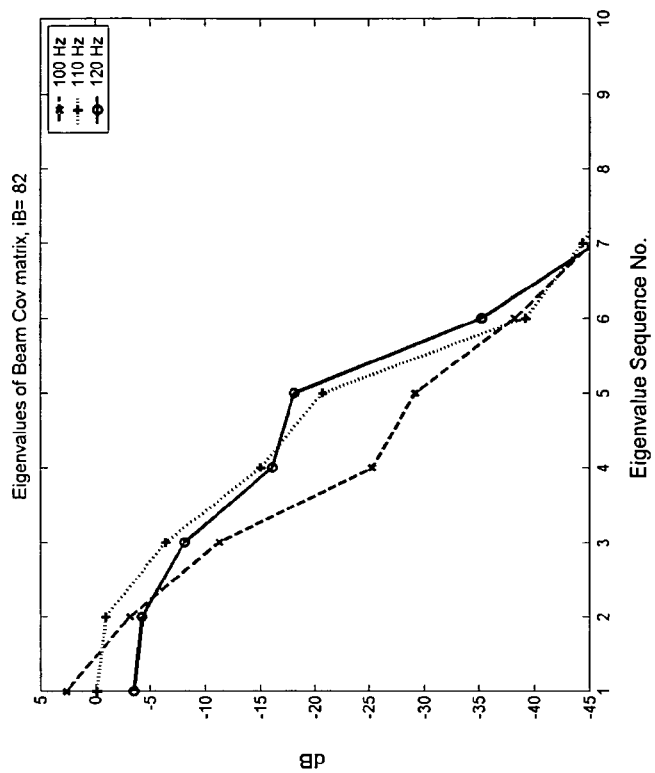
FIG. 5A is a mathematical representation of beam covariance matrices summed over data samples for a target changing bearing.
FIG. 5B is a graph of the eigenvalue spectrum corresponding to FIG. 5A.

As the target changes bearing, the target beam covariance sub-matrix Q will be centered at different angles. FIGS. 4A and 4B show the target beam sub-matrices at $t_j$ and $t_i$, respectively, which occupy different beam space. Conventional processing methods sum (average) the beam covariance matrices over many snapshots, as shown in FIG. 5A, yielding an eigenvalue spectrum spreading over many eigenvalues, as shown in FIG. 5B).

Figure 6:
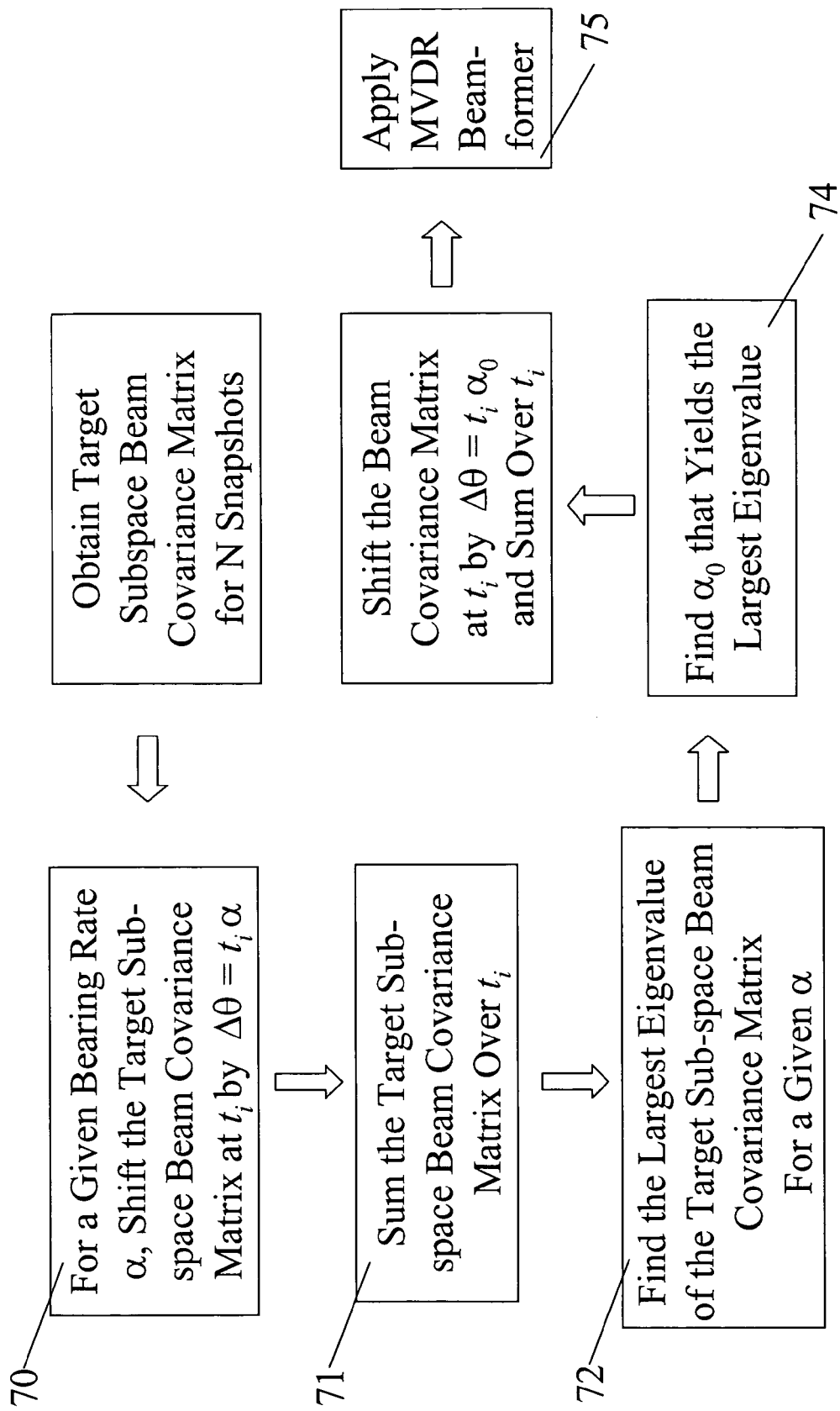
FIG. 6 is a flowchart of an embodiment of the invention for processing a bearing-changing target at a fixed range.

For an embodiment of the invention with reference to the flowchart in FIG. 6 for searching for a target bearing rate at a fixed range, one assumes a bearing rate α, which yields a Δθ=α°, per unit time as shown by the dashed line in FIG. 3. One searches for α that yields the maximum eigenvalue for the beam covariance matrix in the target space by the algorithm described below. For each time frame, the beam sub-matrix is shifted by an index equal to Δθ=−α° per unit time in Step 70 of FIG. 6. The resulting matrices are summed or averaged in Step 71. One determines the largest eigenvalue of the summed covariance matrix in Step 72. One finds the $\alpha_0$ that yields the maximum eigenvalue in Step 73. This value of $\alpha_0$ should reveal the target bearing-rate in Step 74. For the true α, the shifted beam covariance sub-matrix for time $t_i$ should occupy the same signal beam space as the beam covariance sub-matrix at $t_j$, so that they are added up coherently. The entire beam covariance is then re-processed using $\alpha_0$ and summed in Step 74. The summed beam covariance matrix is used to calculate the MVDR beam power in Step 75.

Figure 9:
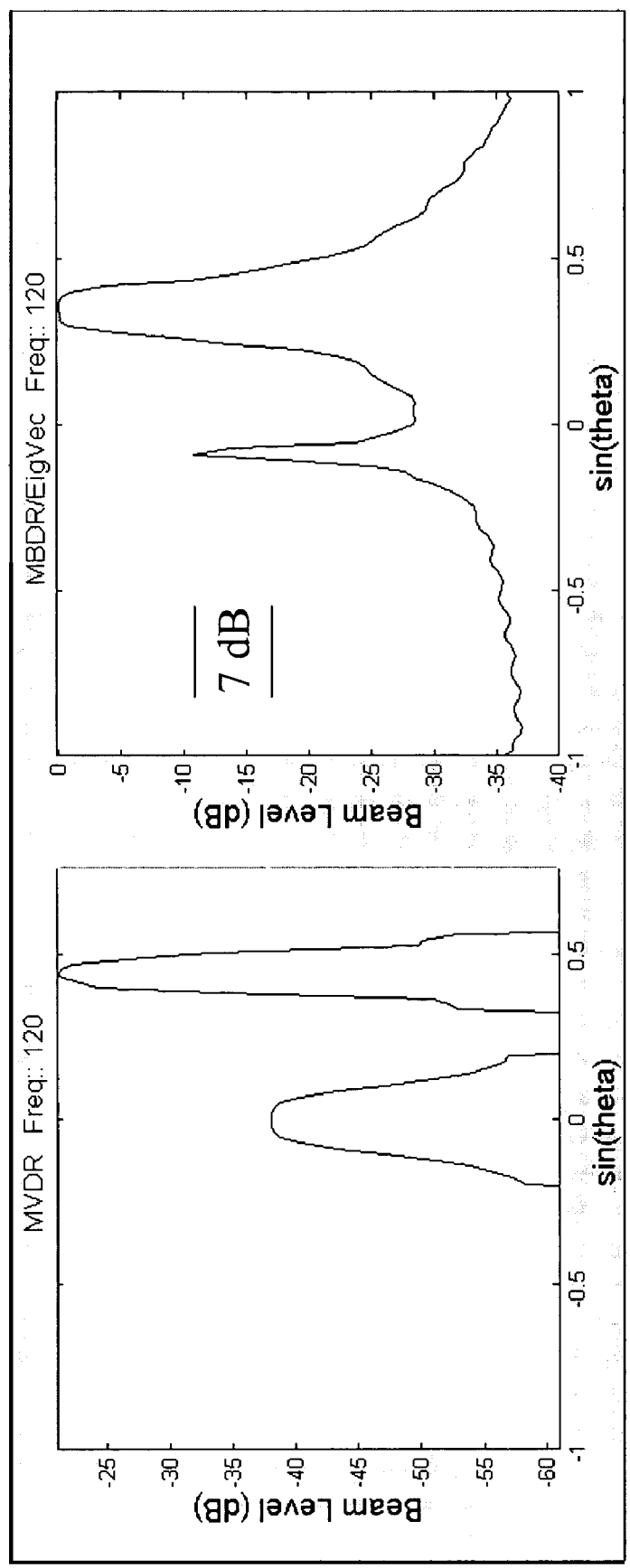
FIG. 9 is a graph comparing the motion compensated beam power according to the instant invention to the conventional adaptive MVDR beam power for a target changing bearing.

For illustrative numerical simulations, a bottom-mounted HLA is considered, the HLA being located in a shallow water environment in the coast of California where the water depth is 210 m, the sound speed is close to 1490 m/s for the majority of the water column except for the top 30 m, and the sound speeds increase to 1525 m/s at the surface. The HLA shall have, for example, 100 elements spaced at 6 m uniformly. For the simulated data, the acoustic signal originates from a fast bearing-changing target and a slow bearing-changing interference source. The target has a speed of 20 knots moving from −6° to 6° in bearing from the broadside of the HLA in 100 time frames. The target range is 5 km and the target depth is 50 m. The interference source is a surface ship with a radiation source at a depth of 5 m. It is located at a range of 10 km, traveling with a speed of 5 knots. It changes bearing form 30° to 33° in the same time period. It has a source level 20 times stronger than the signal. The conventional MVDR beam outputs using a white noise constrain of 2 dB is included in FIG. 9, designed as the Before Compensation figure, for comparison later with the motion compensated result. The beam at the broadside direction has a much wider width than the case for a target at a fixed bearing because the signal has covered a bearing from −6 to 6 degrees.

The data is processed using 1° beam near the broadside directions. This leads to a beam increment of Δ=sin(1°) ≈0.0174, and hence a total of 2/Δ≈115 beams in the sin θ space (versus N=100). For the eigenvalue calculations, we shall use a beam sub-matrix of dimension larger than 5 to include the beam spread due to multipath arrivals and source bearin change. The eigenvalue spectrum is calculated for a sub-matrix Q of dimension 11×11 centered on the signal or interference bearings.

Figure 7:
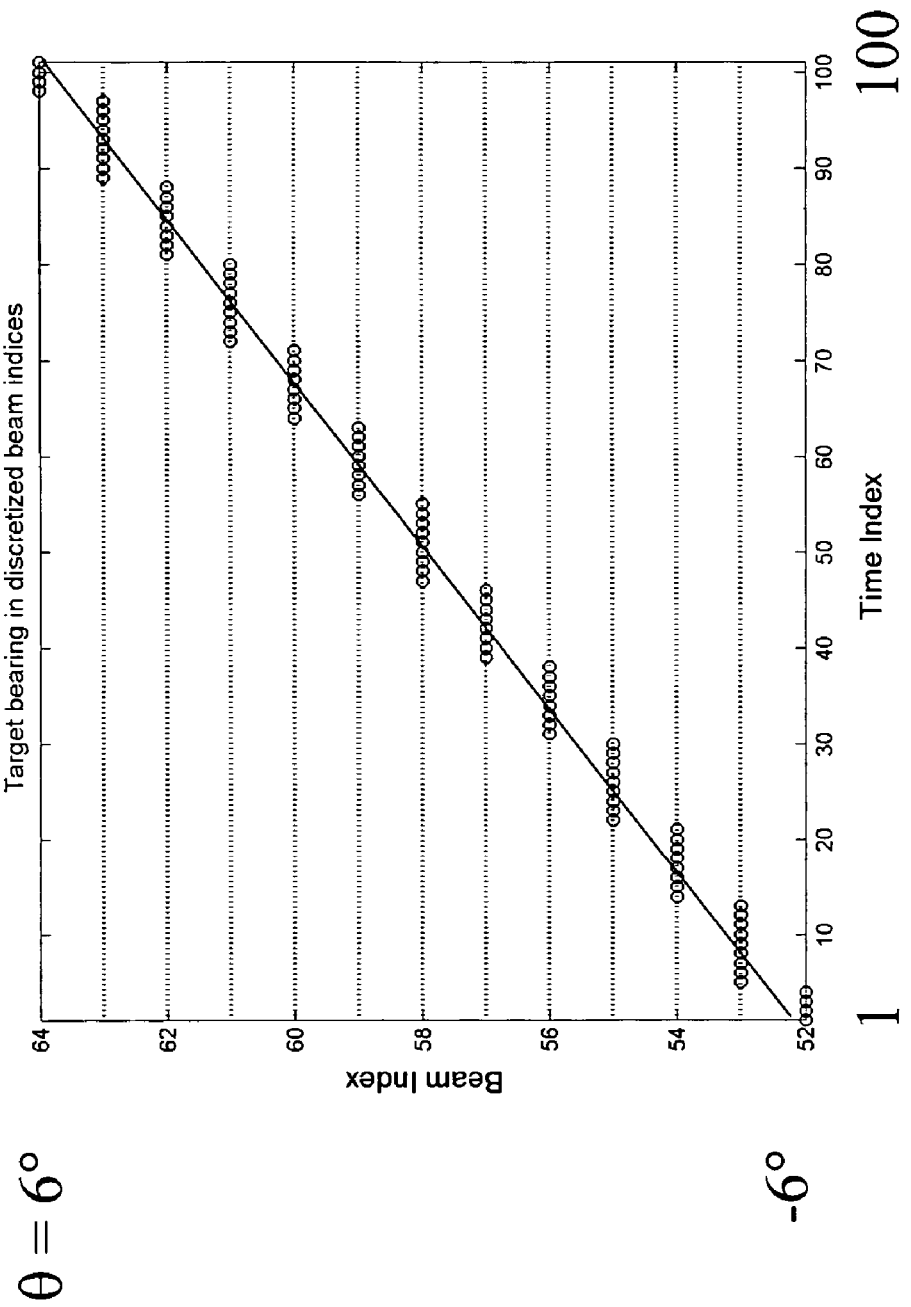
FIG. 7 is a graph of a discrete beam for a target changing bearing, according to the instant invention.

For discrete beams, the search procedure is to re-number the beam indices of the beam cross-spectral matrix $a_{data} a_{data}^H$ for each data sample according to a hypothesized bearing track, as depicted in FIG. 7, and then add them up to produce a beam covariance matrix. The beam index is numbered from 1 to 115 with the beam at sin θ=−1 as no. 1. Using FIG. 7 as an example, there is no bearing change for the first 4 data frames; that is, the signal stays in beam no. 52. Thus, the (complex) beam covariance matrices for time 1 to 4 are added together. For the time frames 5-13, the signal bearing has changed by one beam. The beam cross-spectral matrix for these ($5^{th}$-$13^{th}$) time frames will be shifted up by one index and shifted left by one index with the top-most row and left-most column wrapped around to the bottom-most row and right-most column. The resulting ($5^{th}$-$13^{th}$) beam cross-spectral matrices will be added to the cross-spectral matrices of the previous four ($1^{st}$-$4^{th}$). For the next 9 data frames, according to FIG. 7, the target bearing has changed by two beams. Hence, the beam cross-spectral matrices will be shifted up and shifted left by two indices and added to the previous beam cross-spectral matrices. This process is continued for all 100 data frames for the hypothesized bearing track of FIG. 7. A final beam covariance matrix is obtained for the hypothesized bearing track. This beam covariance matrix will be in principle the same as that for a stationary source, since in the rotating coordinates, the source is stationary.

Figure 8:
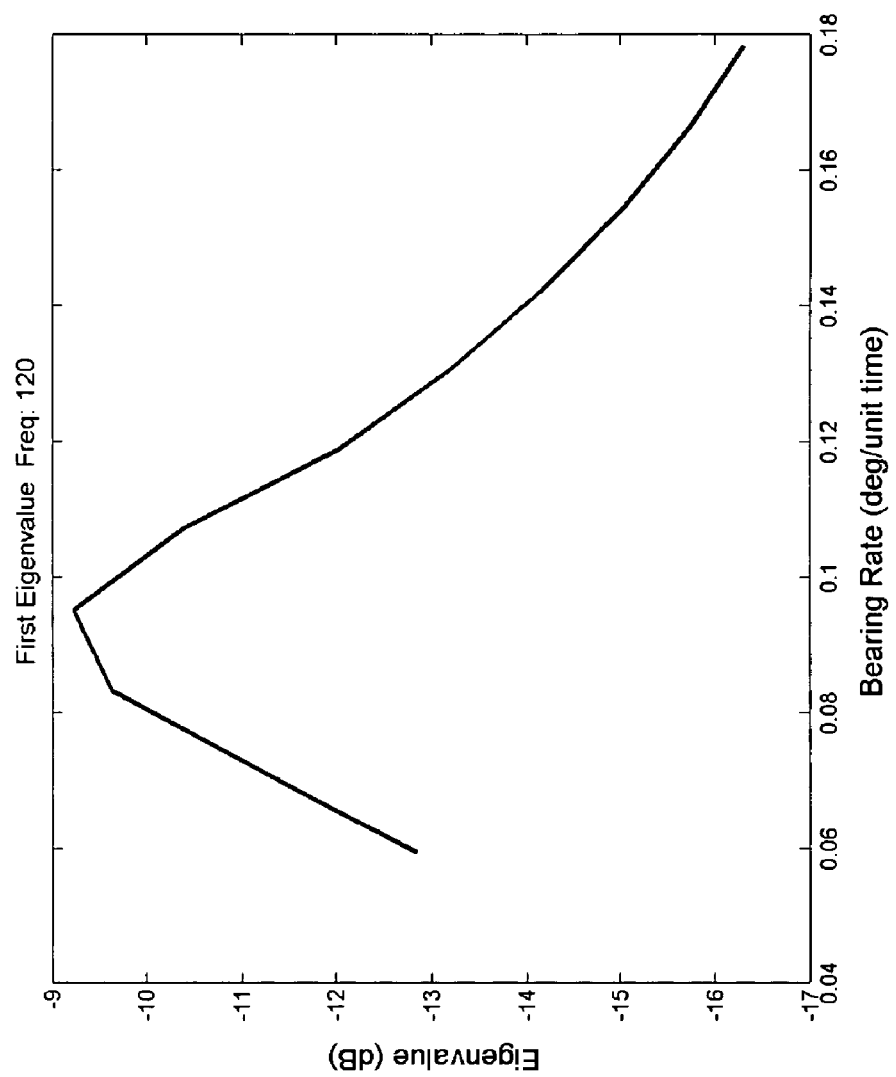
FIG. 8 is a graph of a processor output, where the peak indicates the target bearing rate, according to the instant invention.

For each hypothesized target-bearing rate (i.e., bearing track), one finds the largest eigenvalue of the beam covariance sub-matrix in the signal beam space. After repeating the above process for a given range of bearing rate (i.e., bearing track), one plots the level of the first eigenvalue as a function of the search bearing-rate. The result is shown in FIG. 8. FIG. 8 shows a peak at an estimated bearing rate of ~0.1 deg/unit-time, which is slightly lower than the true value of 0.12 deg/unit-time. The estimation error is due to the discrete beams used for bearing rate compensation.

Using the (final) beam covariance matrix obtained at the bearing rate of ~0.1 deg/unit-time, the beam domain MVDR, Eq. (7) is applied, and the output beam power is plotted in the After Motion Compensation graph of FIG. 9. The signal has a sharp peak as expected for MVDR. The interference source shows up as a broadband peak because its motion was not compensated. The peak-to-interference ratio has improved by 6 dB over the element-space MVDR as shown in the Before Compensation graph of FIG. 9, which did not compensate for motion.

Figure 10:
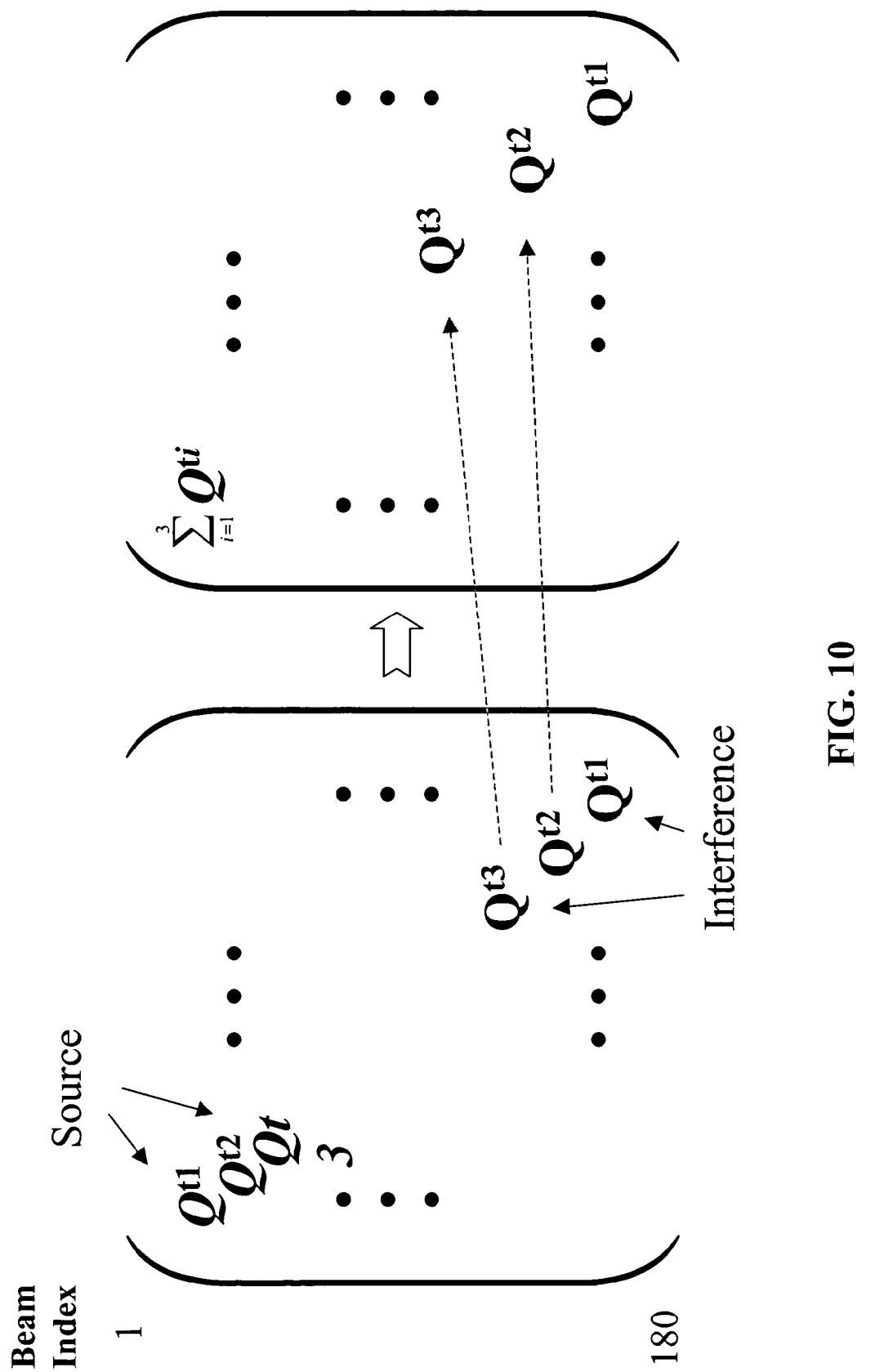
FIG. 10 is a mathematical representation of spreading of the interference beam covariance sub-matrices, when the interference source has a different bearing rate than the target.

The reason for the interference signal suppression when the interference source has a different bearing rate than the signal is explained in FIG. 10. Comparing the signal beam covariance matrix before and after the motion compensation, the beam covariance sub-matrices of the signal in the signal beam covariance matrix after motion compensation were grouped together and added up coherently, whereas the beam covariance sub-matrices of the interference in the signal beam covariance matrix after motion compensation were further spread out in the beam space. Thus, the beam power of the signal is enhanced and the beam power of the interference is not. The strength of the interference relative to the target signal is suppressed after motion compensation compared with that before motion compensation.

The beam domain approach optionally presents an advantage on interference rejection even for a stationary signal and interference. In the element space, the largest eigenvalue is likely to be dominated by a loud interference. In cases when the signal and interference fields are not orthogonal, as is often the case in practice, it is difficult to remove the eigenvector of the interference without losing the signal energy. The situation is different in the beam domain. Note that in the signal beam sub-space, the largest eigenvalue will be dominated by the signal, since energy leakage from the interference source to the signal beam has been suppressed by the array beamforming peak-to-sidelobe ratio ($\geq 20$ dB for the example given above). Removal of the interference eigenvalue/eigenvector has a lesser effect on the signal field. Likewise, in the beam sub-space pointing to the interference, the largest eigenvalue will be dominated by the interference field.

To investigate the target spectral content, one uses a beam sub-space scissorgram following the target since the spectra of individual elements are dominated by the interference signal. For the same reason, to integrate the signal energy coherently across the array for a bearing-changing target, one should use the signal beam covariance matrix following the target. In contrast, the element space covariance matrix will be dominated by the interference field as shown above. The beam covariance sub-matrix at the signal direction has negligible contribution from the interference field.

Search for Target Range Rate for a Fixed Bearing

Another embodiment of the invention addresses motion compensation for a fast moving target at a fixed bearing. An illustrative, numerical example involves a fast range-changing target at the bearing of 0° with a depth, speed, and initial range same as in the case considered above. The surface interference is, for example, at a range of 20 km with a source level 50 times of the signal. It has a fixed bearing of 30° with the same depth and speed as described above. A white noise ~20 dB down from the signal at the element level is assumed.

For range-rate compensation, one needs a discriminator related to range that differentiates the target signal from the interference field. The discriminator to be used here is the frequency-range (scaling) relationship as predicted by the waveguide invariant theory. It has been previously shown for a time-reversal vertical line array ("VLA") that focusing the acoustic energy to a slightly different range than the original source location can be accomplished by frequency shifting. Likewise, for matched-field processing on a VLA, source range change can be compensated for by frequency shift of the covariance matrix. However, the same approach does not work for a HLA, as the element space covariance matrix for a HLA does not have the same frequency and range dependence as for a VLA. The technical reason is that there is only one range parameter for a VLA, but there are many range parameters for a HLA.

The beam covariance matrix for a source changing range will exhibit the same frequency-range dependence as predicted by the waveguide invariant theory. Accordingly, source range-change can be compensated by frequency shift. Consequently, a range compensation algorithm can be used to search for the target range-rate and recover the signal loss due to motion. The interference field is suppressed when the interferer has a different range rate than the target source.

The beam power at the signal direction, that is, broadside to the array, is a function of frequency and time can be plotted. The signal travels 1.03 km during a time period of 100 units. The beam intensity in such a plot exhibits a striation pattern as a function of frequency and time. This pattern has been shown previously to be identical to that of a single element except that the level has been enhanced by the signal gain.

The intensity of the beam covariance matrix between a beam one index lower and another beam one index higher than the signal beam can also be plotted. Such a plot shows the same striation pattern as the beam power. The beam power relates to the diagonal element of the beam covariance matrix.

The slope of the above striation is related theoretically to the so-called waveguide invariant parameter, $\beta$. The waveguide invariant theory says that the slope of the striation for the single-element acoustic intensity, plotted as a function of frequency and range, is given by $$\frac{d\omega}{dr} = \beta \frac{\omega}{r}, \qquad (8)$$

where $\beta$ is given by the ratio of the difference of phase slowness between a pair of modes over that of the group slowness between the same pair of modes. The parameters $\beta$ is called the waveguide invariant since it is a "universal" number for a group of modes. Assuming the source travels with a constant velocity v, the above equation can be rewritten as $$\frac{d\omega}{dt} = \beta \frac{\omega v}{r} \equiv \gamma, \qquad (9)$$

where $\gamma$ is the slope of frequency striation with respect to time. Based on the analysis above, the waveguide invariants can be extended to the beam intensity, and the beam covariance matrix. The parameters $\gamma$ is related to the range rate v.

Based on Eq. (9), the beam intensity at the signal direction satisfies the following equation, $$B(\omega, t+dt) = B(\omega + \gamma d\omega, t). \qquad (10)$$

Thus, the signal range change can be compensated by a frequency-shift between the adjacent data frames. The same is also true for the elements of the beam covariance matrix indexed around the signal directions. The sidelobe beams outside the signal arrival directions will have a different striation pattern.

The processor starts with a potential target of interest at a given bearing. The processor need not assume that $\beta$ is known in advance. The processor also need not assume that the source range is known. An approximate value of the $\gamma$ can be measured from the frequency striation slope of the intensity spectrum of the signal beam. The exact value will be searched for by the motion compensation processor. The parameter $\gamma$ will be called the frequency-shift-rate or frequency-rate for short.

Figure 11:
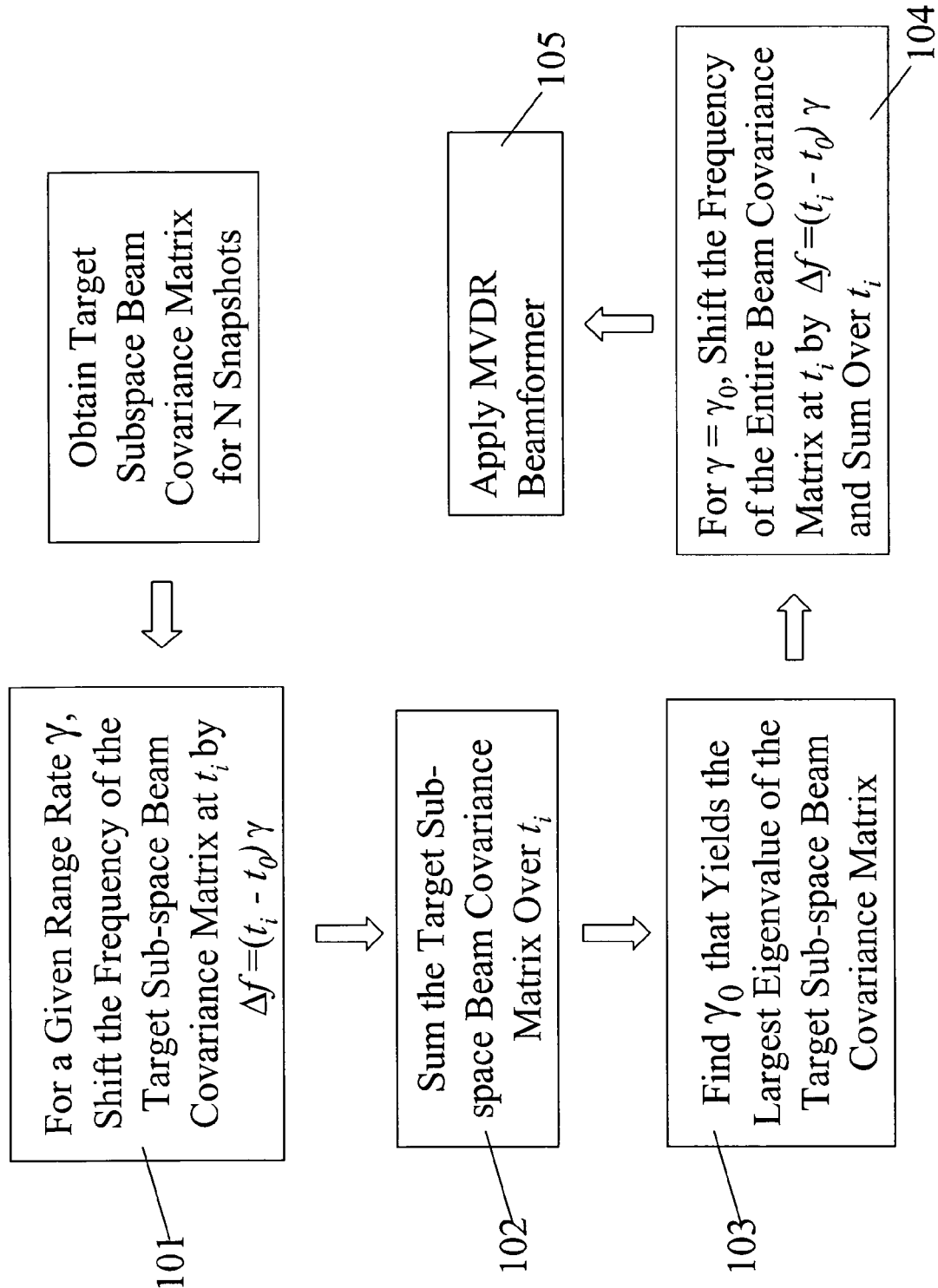
FIG. 11 is a flowchart according to an embodiment of the invention for processing a target changing range at a fixed bearing.
Figure 12:
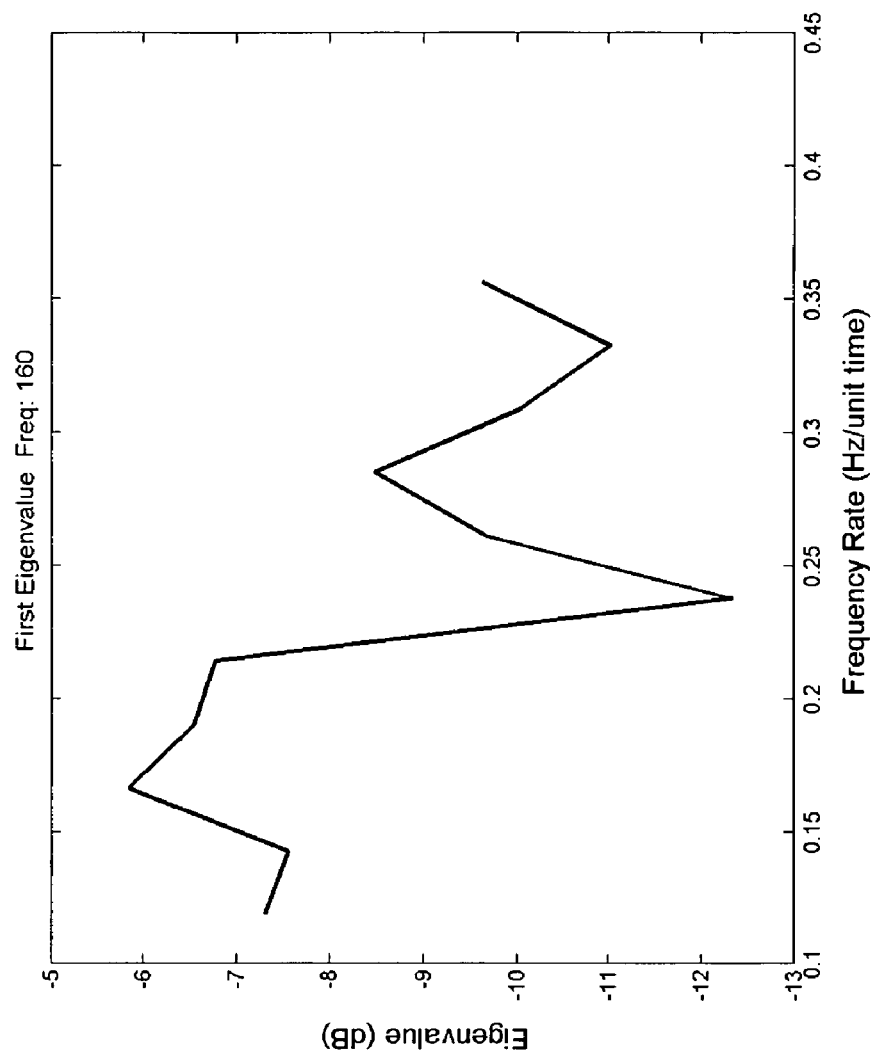
FIG. 12 is a graph of a processor output, where the peak indicates the target range rate, according to the instant invention.

An embodiment of the invention is shown by way of example in the flowchart of FIG. 11 for searching for a target range rate at a fixed bearing. The algorithm for frequency-rate search shown in FIG. 11 is described as follows. For a given frequency rate, the beam covariance matrix for each data frame is shifted in frequency according to Eq. (10) for all of its elements in Step 101. The beam covariance matrices are then summed in Step 102. We then calculate the value of the first (largest) eigenvalue of the beam covariance sub-matrix at the signal arrival direction. The process is repeated for other anticipated frequency rates. The eigenvalue is then plotted as a function of the frequency-shift-rate as shown in FIG. 12. One searches for the largest eigenvalue in FIG. 12, which yields an estimation of the frequency-rate (0.16 Hz/unit-time in FIG. 12) associated with the target range rate in Step 103 of FIG. 11. After determining this frequency-rate, the entire beam covariance matrix will be summed using this frequency-rate in Step 104 of FIG. 11. The final beam covariance matrix will be used by the beam domain adaptive processor in Step 105 of FIG. 11.

Figure 13:
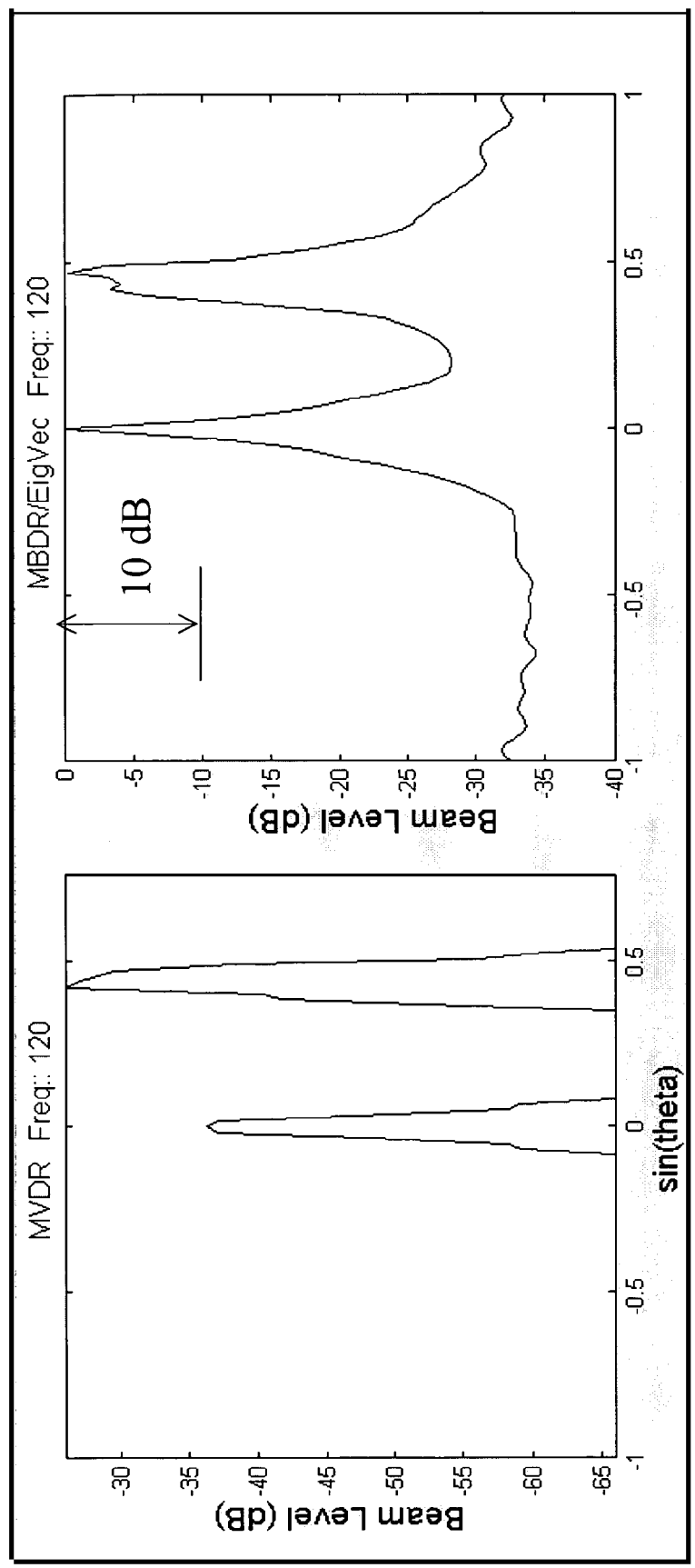
FIG. 13 is a graph comparing the motion compensated beam power according to the instant invention to the conventional adaptive MVDR beam power for a target changing range.

In FIG. 13, the Before Compensation graph shows the beam power using the element space MVDR algorithm, with the covariance matrix integrated over the 100 data frames without motion compensation. The beam pointing to the surface ship is somewhat skewed due to the spreading of mode arrival angles as remarked above. In FIG. 13, the After Motion Compensation graph shows the beam power using the beam domain MVDR algorithm that includes range-rate compensation via the above frequency-shift algorithm. Comparing the After Motion Compensation graph with the Before Compensation graph, it can be seen that the signal-to-interference ratio has improved by 10 dB by the range-rate compensation algorithm. While the signal power has been coherently added up following the frequency striation of the signal, the interference beam power has been suppressed since the interference field has a different frequency-shift-rate than the signal. Note that the interferer is at a different range and has a different speed than the signal source.

Although the above simulation uses a signal at the broadside direction, the same approach can be applied to a signal at an endfire direction. It has been shown before that the signal arrival beams for a near endfire signal have the same beam striation pattern as the signal beam for a broadside signal. Each signal arrival beam may have a somewhat lower intensity due to signal energy spread over multiple beams.

Figure 14:
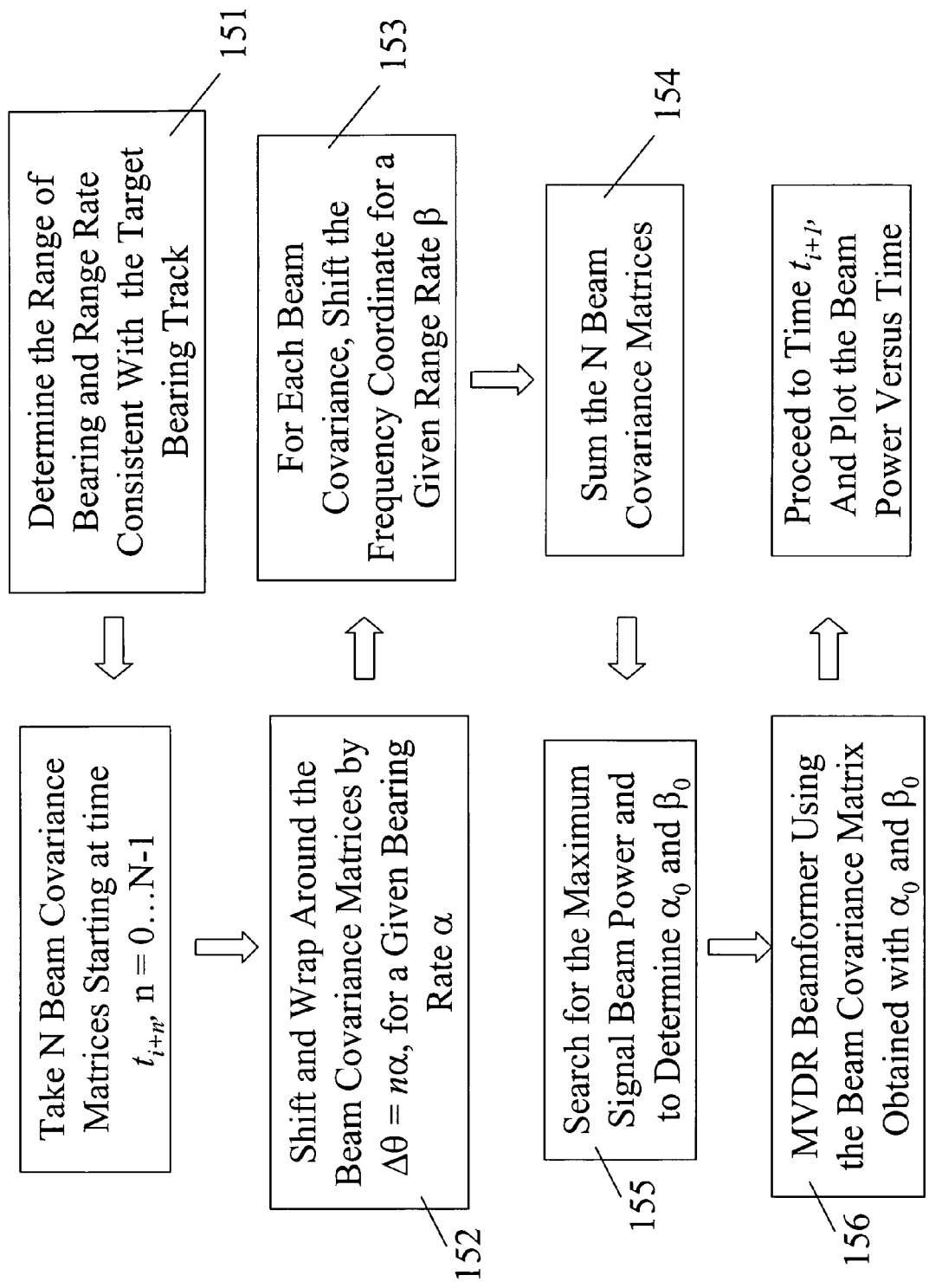
FIG. 14 is a flowchart according to an embodiment of the invention for processing a target changing bearing and range at the same time.

Algorithm for Motion Compensation: Target with a Non-zero Bearing and Range Rate In another embodiment of the invention, the above processing techniques can be combined and applied to a target simultaneously changing bearing and range. Such an embodiment is described, by way of example, using a flowchart for beam time record compensation for target motion in FIG. 14. The process described in the flowchart involves a two-dimensional search for the bearing and range rate. As discussed above, the first step is to identify a potential target in the beam time record, and the target beam sub-space. For a given time window $t_i$ to $t_{i+N-1}$, determine a range of possible bearing-rate from the total bearing change and a range of possible range-rate that is consistent with the bearing history in Step 151 of FIG. 14. At each time, shift and wrap around the elements of the beam covariance matrices according to the hypothesized bearing-rate in Step 152 and shift the frequency spectrum according to the hypothesized range-rate in Step 153. Sum the beam covariance matrices over N data samples in Step 154. Search for the bearing-rate and range-rate that yield the highest signal power in Step 155. Use the beam covariance matrix determined with $\alpha_0$ and $\beta_0$ for MVDR beamforming in Step 156. This yields the motion compensated beam power at time $t_j$. Proceed to process next batch of data from $t_j$ to $t_{j+N-1}$, j=i+1 to i+M.

Depending on the number of beams used, an alternative is to search $\alpha_0$ and $\beta_0$ using only the beam sub-matrices in the target signal space and then process the entire beam covariance matrices using $\alpha_0$ and $\beta_0$ as depicted in FIGS. 6 and 11.

Obviously, many modifications and variations of the instant invention are possible in light of the above teachings. It is therefore to be understood that the scope of the invention should be determined by referring to the following appended claims.

What is claimed is:

1. An apparatus comprising:
 a horizontal line array comprising a plurality of hydrophones for receiving a target acoustic signal from a target and an interference acoustic signal from an interference source; and
 a processor cooperating with said horizontal line array, said processor detecting the target, at least in art by compensating for at least one of target motion and interference motion,
 wherein said target motion comprises at least one of target bearing and target ranging, and wherein said interference motion comprises at least one of interference bearing and interference ranging,
 said target comprising a target bearing rate and a target range rate,
 said interference source comprising an interference bearing rate and an interference range rate, and
 said processor suppressing the interference acoustic signal based on a difference between at least one of the target bearing rate and the target range rate, and at least one of the interference bearing rate and the interference range rate, and
 wherein said processor determines a beam covariance matrix for the target from a plurality of hydrophone covariance matrices corresponding to said plurality of hydrophones.

2. The apparatus according to claim 1, wherein the beam covariance matrix includes a target-search sub-space beam covariance matrix representing a largest beam power of the target, and an interference sub-space beam covariance matrix representing an interference contribution from the interference source,
 said processor separating the target-search sub-space from the interference sub-space by suppressing the interference contribution.

3. The apparatus according to claim 2, said processor shifting the target-search sub-space beam covariance matrix according to a plurality of estimated target-hearing rates, thereby generating a plurality of shifted target-search sub-space beam covariance matrices;
 said processor summing the plurality of shifted target-search sub-space beam covariance matrices;
 said processor identifying a largest eigenvalue of a sum of the shifted plurality of shifted taraet-search sub-space beam covariance matrices;
 said processor identifying a calculated target bearing rate from the largest eigenvalue;
 said processor shifting the beam covariance matrix by the calculated target bearing rate;
 said processor applying adaptive array processing to the shifted beam covariance matrix.

4. The apparatus according to claim 2, said processor shifting a frequency scale of the target-search sub-space beam covariance matrix according to a plurality of estimated target-range rates, thereby generating a plurality of shifted target-search sub-space beam covariance matrices;
 said processor summing the plurality of shifted target-search sub-space beam covariance matrices;

said processor identifying a largest eigenvalue of a sum of the shifted plurality of shifted target-search sub-space beam covariance matrices;

said processor identifying a calculated target range rate from the largest eigenvalue;

said processor shifting the beam covariance matrix by the calculated target range rate;

said processor applying adaptive array processing to the shifted beam covariance matrix.

5. The apparatus according to claim 2, said processor shifting the target-search sub-space beam covariance matrix according to a plurality of estimated target-bearing rates, thereby generating a plurality of bearing-rate-shifted target-search sub-space beam covariance matrices;

said processor shifting a frequency scale of the plurality of bearing-rate-shifted target-search sub-space beam covariance matrices according to a plurality of estimated target-range rates, thereby generating a plurality of bearing-rate-and-range-rate-shifted target-search sub-space beam covariance matrices;

said processor summing the plurality of bearing-rate-and-range-rate-shifted target-search sub-space beam covariance matrices;

said processor identifying a largest eigenvalue of a sum of the plurality of bearing-rate-and-range-rate-shifted target-search sub-space beam covariance matrices;

said processor identifying a calculated target bearing rate and a calculated target range rate from the largest eigenvalue;

said processor shifting the beam covariance matrix by the calculated target bearing rate and the calculated target range rate;

said processor applying adaptive array processing to the shifted beam covariance matrix.

6. A method comprising:

receiving, at a horizontal line array comprising a plurality of hydrophones, a target acoustic signal from a target and an interference acoustic signal from an interference source;

detecting the target, at least in part, by compensating for at least one of target motion and interference motion, wherein the target motion comprises at least one of target bearing and target ranging, and wherein the interference motion comprises at least one of interference bearing and interference ranging, the target comprising a target bearing rate and a target range rate, the interference source comprising an interference bearing rate and an interference range rate;

supressing the interference acoustic signal based on a difference between at least one of the target bearing rate and the target range rate, and at least one of the interference bearing rate and the interference range rate; and, determining a beam covariance matrix for the target from a plurality of hydrophone covariance matrices corresponding to the plurality of hydrophones.

7. The method according to claim 6, wherein the beam covariance matrix includes a target-search sub-space beam covariance matrix representing a largest beam power of the target, and an interference sub-space beam covariance matrix representing an interference contribution from the interference source, the method further comprising separating the target-search sub-space from the interference sub-space by suppressing the interference contribution.

8. The method according to claim 7, further comprising:

shifting the target-search sub-space beam covariance matrix according to a plurality of estimated target-bearing rates, thereby generating a plurality of shifted target-search sub-space beam covariance matrices;

summing the plurality of shifted target-search sub-space beam covariance matrices;

identifying a largest eigenvalue of a sum of the shifted plurality of shifted target-search sub-space beam covariance matrices;

identifying a calculated target bearing rate from the largest eigenvalue;

shifting the beam covariance matrix by the calculated target bearing rate; and applying adaptive array processing to the shifted beam covariance matrix.

9. The method according to claim 7, further comprising:

shifting a frequency scale of the target-search sub-space beam covariance matrix according to a plurality of estimated target-range rates, thereby generating a plurality of shifted target-search sub-space beam covariance matrices, summing the plurality of shifted target-search sub-space beam covariance matrices;

identifying a largest eigenvalue of a sum of the shifted plurality of shifted target-search sub-space beam covariance matrices;

identifying a calculated target range rate from the largest eigenvalue;

shifting the beam covariance matrix by the calculated target range rate; and applying adaptive array processing to the shifted beam covariance matrix.

10. The method according to claim 7, further comprising:

shifting the target-search sub-space beam covariance matrix according to a plurality of estimated target-bearing rates, thereby generating a plurality of bearing-rate-shifted target-search sub-space beam covariance matrices, shifting a frequency scale of the plurality of bearing-rate-shifted target-search sub-space beam covariance matrices according to a plurality of estimated target-range rates, thereby generating a plurality of bearing-rate-and-range-rate-shifted target-search sub-space beam covariance matrices, summing the plurality of beaming-rate-and-range-rate-shifted target-search sub-space beam covariance matrices;

identifying a largest eigenvalue of a sum of the plurality of bearing-rate-and-range-rate-shifted target-search sub-space beam covariance matrices;

identifying a calculated target bearing rate and a calculated target range rate from the largest eigenvalue;

shifting the beam covariance matrix by the calculated target hearing rate and the calculated target range rate; and applying adaptive array processing to the shifted beam covariance matrix.

* * * * *